United States Patent
Qing et al.

(10) Patent No.: US 7,925,252 B2
(45) Date of Patent: Apr. 12, 2011

(54) CONTAINER-LEVEL TRANSACTION MANAGEMENT SYSTEM AND METHOD THEREFOR

(75) Inventors: Richard Qing, Ottawa (CA); Laura Doktorova, Mississauga (CA); Kamen Vitanov, Mississauga (CA); Michael Shenfield, Richmond Hill (CA)

(73) Assignee: Research In Motion Limited, Waterloo, Ontario (CA)

( * ) Notice: Subject to any disclaimer, the term of this patent is extended or adjusted under 35 U.S.C. 154(b) by 1394 days.

(21) Appl. No.: 11/405,600

(22) Filed: Apr. 18, 2006

(65) Prior Publication Data
US 2006/0265448 A1 Nov. 23, 2006

Related U.S. Application Data

(60) Provisional application No. 60/672,088, filed on Apr. 18, 2005.

(51) Int. Cl.
*H04W 24/00* (2009.01)
(52) U.S. Cl. ...... 455/425; 455/406; 455/407; 455/550.1; 455/554.2; 455/557
(58) Field of Classification Search .................. 455/406, 455/407, 550.1, 554.2, 557
See application file for complete search history.

(56) References Cited

U.S. PATENT DOCUMENTS

| | | | |
|---|---|---|---|
| 5,878,206 | A | 3/1999 | Chen |
| 5,898,783 | A * | 4/1999 | Rohrbach ..................... 340/5.31 |
| 6,006,229 | A | 12/1999 | Schmidt |
| 6,219,666 | B1 | 4/2001 | Krishnaswamy |
| 6,249,291 | B1 | 6/2001 | Popp |
| 2003/0033182 | A1* | 2/2003 | Stok et al. ......................... 705/7 |
| 2003/0103088 | A1* | 6/2003 | Dresti et al. ................... 345/835 |
| 2004/0128328 | A1* | 7/2004 | Leff et al. ...................... 707/201 |
| 2005/0033720 | A1 | 2/2005 | Verma |
| 2005/0193056 | A1 | 9/2005 | Schaefer et al. |
| 2005/0197867 | A1* | 9/2005 | Edgett et al. ....................... 705/5 |
| 2005/0256972 | A1* | 11/2005 | Cochran et al. ................ 709/245 |
| 2006/0230402 | A1* | 10/2006 | Newport et al. ................... 718/1 |
| 2009/0254778 | A1* | 10/2009 | Huang et al. ..................... 714/38 |

FOREIGN PATENT DOCUMENTS

| | | |
|---|---|---|
| EP | 0805394 | 11/1997 |
| WO | 9946674 | 9/1999 |
| WO | 0133349 | 5/2001 |
| WO | WO 01/33349 | 5/2001 |

OTHER PUBLICATIONS

Lim J B et al: "Data Duplication and Consistency in a Mobile, Multidatabase Environment", Parallel and Distributed Systems, 1998. Proceedings. 1998 International Conference on Tainan, Taiwan Dec. 14-16, 1998, Los Alamitos, CA, USA IEEE Comput. Soc, US, Dec. 14, 1998 pp. 50-58, XP010318658 ISBN: 978-0-8186-8603-0.
"Atomicity Implementation in Mobile Computing", Database and Expert Systems Applications, 1999, Proceedings, Tenth International Workshop on Florence, Italy Sep. 1-3, 1999, Los Alamitos, CA, USA, IEEE Comput. Soc, US, Sep. 1, 1999, pp. 105-113, X010352416 ISBN: 978-0-7695-0281-6.

* cited by examiner

*Primary Examiner* — Daniell L Negrón
*Assistant Examiner* — Huy D Nguyen
(74) *Attorney, Agent, or Firm* — Ogilvy Renault LLP

(57) ABSTRACT

An application container-level transaction management system for managing transactions of an application on a wireless device. The system comprises a transaction manager for providing an interface to the application container for accessing methods for creation and execution of transactions in a hierarchical order. The transactions comprising correlative operations. The system further comprises a transaction stack for storing the transactions to be executed in an execution order according to the hierarchical order, the order of execution providing for at least one of rollback and completion of the correlative operations.

20 Claims, 3 Drawing Sheets

CONTAINER-LEVEL TRANSACTION MANAGEMENT SYSTEM AND METHOD THEREFOR

CROSS-REFERENCE TO RELATED APPLICATIONS

This patent application claims priority of U.S. Patent No. 60/672,088 that was filed Apr. 18, 2005 and which is entitled "Container-Level Transaction Management System And Method Therefor", the specification of which is hereby incorporated by reference.

FIELD OF THE APPLICATION

The application relates to transaction management in a distributed object computing environment, and more specifically, to an application-container transaction management system and method of a wireless device.

BACKGROUND OF THE ART

An application installed and running on a wireless device, which serves as the fully-fledged wireless client of a Web service, must be capable of handling fairly complex transactions in order to accomplish complex tasks. Such complex transactions may be nested, i.e. one transaction (the parent transaction) contains any number of sub-transactions (offspring transactions), each of them can in turn have its own sub-transactions. Each transaction involves a set of correlative data creation/deletion/modification operations which can be triggered (simultaneously) by multiple parties with which the wireless device application is in communication, e.g. incoming messaging, on-screen data input, and function invocations.

One solution used to avoid the issue of transaction management on a wireless device requires the use of a post-transaction (PT) synchronization mechanism. Such a PT data/application synchronization mechanism is used for applications that need data exchange from/to other computing devices and/or services. For example, a post-transaction mechanism is used between a Calendar/Address application on a wireless device and its counterpart on the desktop, e.g. a Palm organizer™ and Microsoft Outlook™. However, this solution works only for those applications that are able to provide basic functionality or services without real-time data exchange with other parties (devices and services) in the same computing context. This solution is not ideal even for these applications, for the user is obligated, or a proprietary data synchronization system has to be designed, to update the data manually, and resolve potentially unsolvable data conflicts caused by the asynchronous data update process. An example of a proprietary automatic data synchronization system would be automatic email-synchronization between a wireless device and a desktop email client, such as Research In Motion Limited's push technology. Data synchronization happens automatically after each email operation, which does not involve any complex transaction management on the wireless device.

Another solution to transaction management for wireless devices is deploying a server-side transaction manager to conduct all transactions. In this manner, no complex transactions need to be executed on the wireless device, and only a thin Graphical User Interface (GUI) wireless application is implemented on the wireless device. A typical example of such a wireless application would be wireless Web browser, which might be able to cache input data on a screen, but would not have the ability to perform any "real" transactions, not to mention container-level complex transactions.

DESCRIPTION OF THE DRAWINGS

In order that the application may be readily understood, embodiments are illustrated by way of example in the accompanying drawings.

Further details of the application and its advantages will be apparent from the detailed description included below.

DETAILED DESCRIPTION

There is a need therefore for a system and method to allow the efficient management and execution of complex transactions on wireless devices.

There exists furthermore a need for a system and method that allow for container-level transaction management at the wireless device, eliminating the need to manually synchronize a wireless device with other parties and the dependency on a server-side transaction manager.

Hence, a container-level transaction management system is described for providing centralized and efficient transaction management for wireless applications running under the management of a container. The container-level transaction management system provides for rollback and completion of correlative operations, and combinations of them, which could be associated with multiply nested transactions.

The container-level transaction management system described is very compact and does not pose any significant overhead in terms of processing and runtime storage resources.

According to a first aspect, there is provided an application container-level transaction management system for managing transactions of an application on a wireless device. The system comprises a transaction manager for providing an interface to the application container for accessing methods for creation and execution of transactions in a hierarchical order. The transactions comprise correlative operations. The system further comprising a transaction stack for storing the transactions to be executed in an execution order according to the hierarchical order, the order of execution providing for at least one of rollback and completion of the correlative operations.

According to another aspect, there is provided a method for managing execution of hierarchically ordered transactions in an application container of a wireless device. The method comprises: obtaining a transaction created by the application container; adding the transaction to a stack, and if the transaction has offspring transactions, adding the offspring transactions to the stack in an execution order according to a hierarchical order defined by the relationship between the transactions; executing the transactions in the execution order; and removing the transactions from the stack following execution.

These and other aspects such as system, computer program product, etc. will be apparent to those of ordinary skill in the art.

Figure 1:
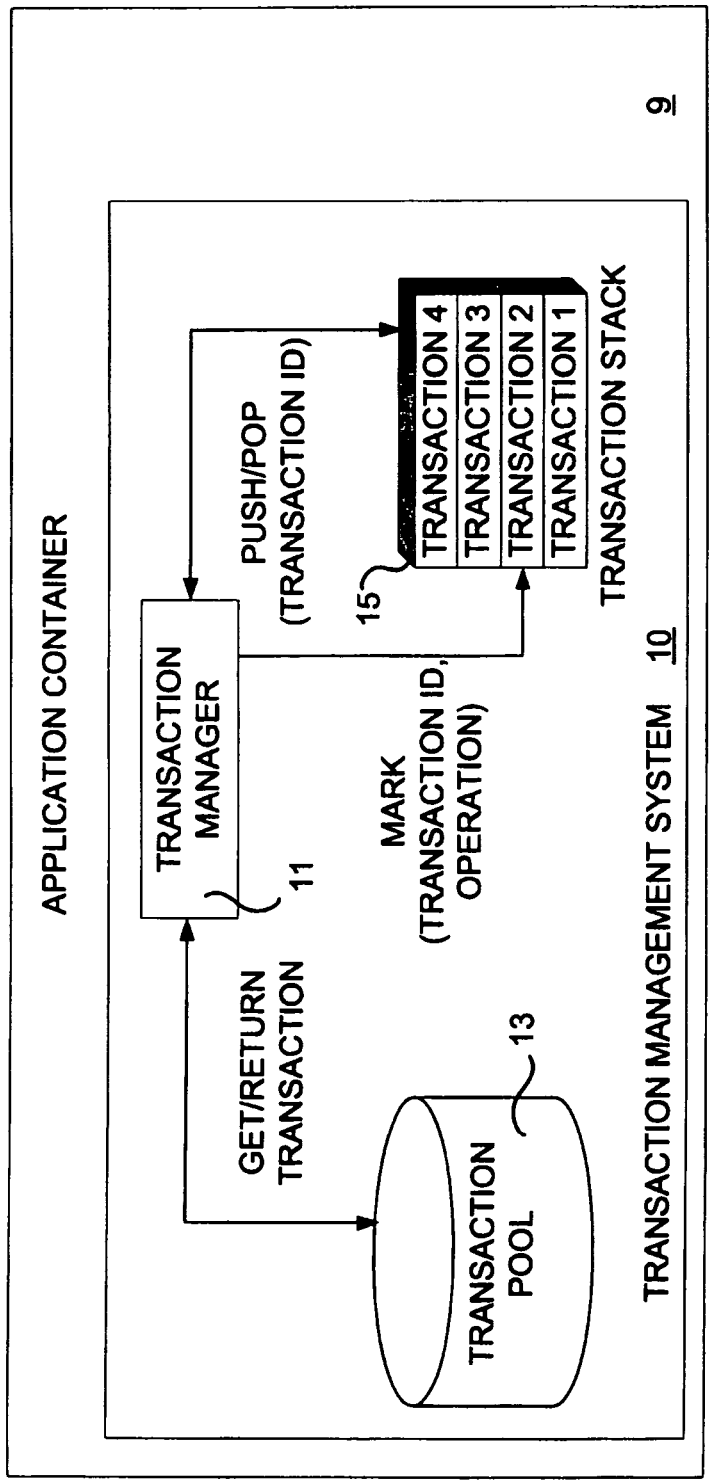
FIG. 1 is a block diagram which shows an application-container with a transaction manager system according to an embodiment.

Now referring to FIG. 1, there is shown an embodiment of an application container-level transaction management system.

An application container 9 is a runtime environment provisioned on a wireless device that provides basic services or functions required for a wireless application installed on a wireless device. The services provided include, but are not limited to, communication services, message services, GUI services, data management services, and execution services.

The wireless devices (not shown) referred to may be of various types, such as Personal Digital Assistants (PDAs), smart phones, etc. In a preferred embodiment, the wireless device is a BlackBerry™ device, manufactured by Research In Motion Limited. Such devices typically include programmable processors and storage devices for storing instructions and data for configuring the processor.

With respect to FIG. 1, the transaction management system 10 of the application container 9 comprises a transaction manager 11, an optional transaction pool 13 and a transaction stack 15. The transaction management system 10 operates on transactions. In an embodiment transactions are transaction objects, such as the transaction object 17 illustrated in FIG. 2. All available transaction objects 17 are stored in the transaction pool 13 to facilitate reusability and thus lower storage overhead.

A transaction pool is just a mechanism to reuse transaction objects to reduce the overhead associated with creating objects and garbage-collecting them, and the degree to which the transaction pool is efficient depends mainly on its size. For a specific device with a specific Java™ Virtual Machine, the appropriate size of the transaction pool should be determined experimentally, in order to provide the most efficiency.

Some systems may choose not to use a transaction pool, if their object-creation/garbage collection is efficient enough.

Figure 2:
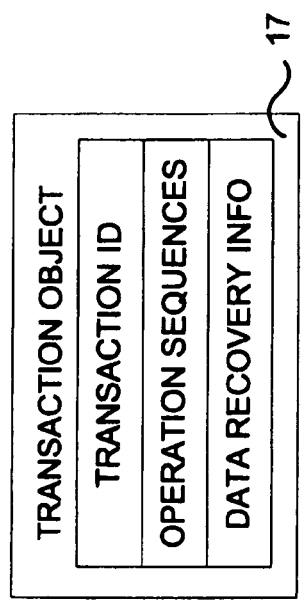
FIG. 2 is a block diagram showing the structure of a transaction object according to an embodiment.

As shown in FIG. 2, each transaction is uniquely identified by its transaction ID. A new transaction ID is generated by the transaction pool 13 when requested or reset. Moreover, a current transaction ID is generated by simply increasing the previous ID by 1. The very first ID is 1. The transaction ID is wrapped back to 1 when the maximum number is encountered. This algorithm is efficient yet adequate for usage with the constraints of a small wireless device.

Each transaction object 17 may have a set of operation sequences, each of them being indexed by the data reference number that the operations are associated to. Such an indexable operation sequence makes transaction updating, and transaction operations, such as completion and rollback, efficient. The following illustrates one manner of such sequences and data recovery storage. Assume that fields 0 and 1 of a data component are modified where the data component is referenced in a runtime representation with a data handle (e.g. 0x3848544400300701).

In one implementation, an entry for data handle 0x3848544400300701 is added to a hash table where the data handle, which is of type long, provides a key to the hash table where an entry indexed in the table is an integer array to represent an operation sequence for the particular indexed data component. A particular operation sequence may or may not contain recovery data. In this example, recovery data is included since the operation to be stored in the structure is "modification", meaning modification to existing data.

Figure 4:
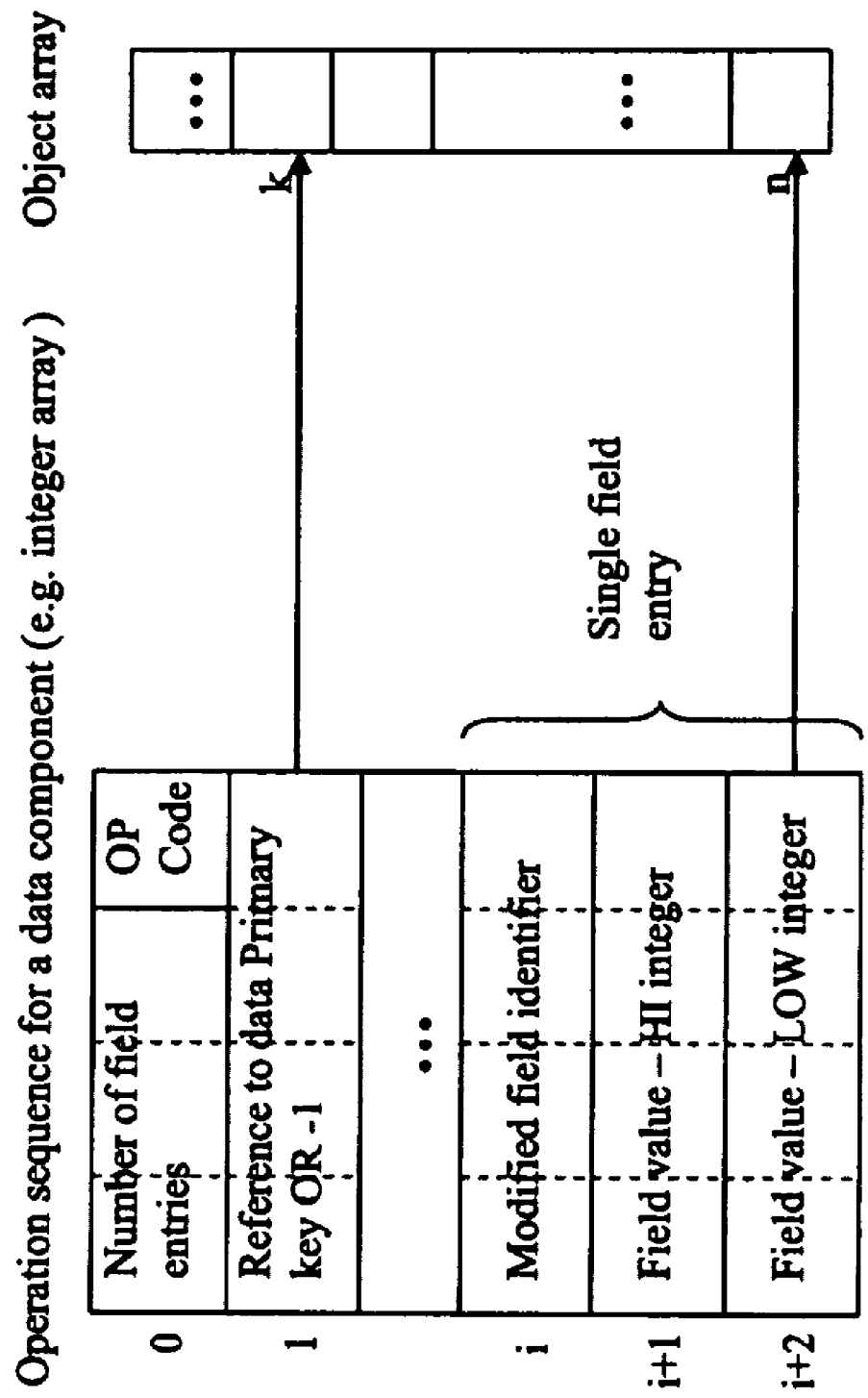
FIG. 4 is a schematic representation of an operation sequence for a data component and its associated transaction object array according to an embodiment.

Preferably, the format for the operation sequence (e.g. integer array) is compact as is illustrated in FIG. 4. The structure of the operation sequence is further described below.

First integer (4 bytes): Most significant 3 bytes: represents a # of fields modified (−1 for all, 0 for none, any positive number for the number of fields modified) and Least significant 1 byte: a predefined Opcode representing the operation sequence being recorded (e.g. creation, modification, deletion, mark_deletion etc.).

Second integer: Primary key flag. −1 for none, otherwise the index to the object array, which is associated with a specific transaction to keep the object value, if any; a primary key of the data component affected by the operation sequence may be kept in an object array in the form of an object containing the value of the primary key field(s), if any.

Three integers are used to represent each field of the data being stored for data recovery. In this example with fields 0 and 1 being stored, only 6 integers for the two fields are modified. For example:

integer i: fieldID //e.g. 0, or 1 in this example.
integer i+1: the high portion of the field value //
integer i+2: the low portion of the field value //
For example, if the field value is of type long or a complex data type then 2 integers are needed to store the value.
Again, if the value is an object, then the index to the object array where the value is kept; −1 if the object value is null.

A fieldID is defined in a syntax that would include or imply the field type, e.g. integer, long, decimal, date, enum, data, string etc.

It has been mentioned that if the operation is a creation operation, no recovery data needs to be kept as there is no pre-existing data to rollback to. Thus only the "First integer" is needed.

The use of sequential operations associated with a data reference allows multiple operations to be always merged into one, based on the fact that the status of data only needs to be recorded at the point at which the transaction starts. For example, when the first operation of a transaction is a creation operation, no matter what the following operations are, the creation operation is recorded. For a deletion operation, no matter what the following operations are, the deletion operation is recorded. For a modification operation however, if the following operation is a deletion operation, the rule is to replace the modification with deletion, otherwise record it as a modification.

The data recovery information field of a transaction object 17 contains sequences of numbers used to keep track of data that might need recovery (e.g. on rollback). For creation operations of a given transaction object, no data recovery information is needed. For a deletion operation, a sequence of numbers is stored representing all fields of the object to be deleted. If some fields contain objects, these objects are backed up. For a modification operation, a sequence of numbers is stored representing the modified fields of the object. If some of the modified fields are objects, these objects are backed up.

The transaction manager 11 provides an interface to the application container 9 and access to a set of methods allowing the application container 9 to operate on complex hierarchically ordered (nested) transactions. Some examples of operations provided to the application container 9 will be described below.

In order to start a transaction, a start_transaction method can be invoked, which would return the transaction ID as the identifier of the transaction started. The transaction ID will be used to refer to the particular transaction object 17 by the application container 9. When a transaction is started, the transaction manager 11 gets a transaction from the transaction pool 13 and pushes the transaction object 17 onto the transaction stack 15 for execution.

The transaction pool 13 is a compact and efficient pool meant to minimize the creation of transaction objects 17, while maximizing re-usage of transaction objects 17. The two main operations available to the transaction manager 11 for operating on the transaction pool 13 are "get transaction" and "return transaction". One manner of these operations may be illustrated with reference to pseudo code as follows:

```
function get_transaction_obj( ) {
    size = getPoolsize( );
    if (size != 0) {
        obj = popTheLastOne( );
    } else {
        obj = newObj( );
    }
}
function return_transaction_obj(obj) {
    if (getPoolsize( )<MAX_POOL_SIZE) {
        reset(obj);
        addToPool(obj);
    }
}
```

The "get transaction" function is invoked whenever a new transaction is started by the application container. The transaction pool 13 may be implemented as a stack that returns to the transaction manager a transaction object whenever one is required, provided that the pool is not empty, meaning that there are no transaction objects available in the pool. If such is the case, a transaction object may be generated and provided to the transaction manager 11.

The "return transaction" function is invoked by the transaction manager 11 in order to add back a transaction object to the transaction pool. Transaction objects are returned by the transaction manager 11 after being popped from the transaction stack 15, i.e. whenever a transaction has either been completed or rolled back. A transaction object will not be returned back to the transaction pool 13 if the maximum pool size has been reached, so as not to overuse the memory of the wireless device.

Returning now to the methods provided by the transaction manager 11, in order to complete a transaction that has been started, i.e. is on the transaction stack 15, the complete_transaction operation can be invoked. The specified transaction and all of its children transactions would be completed, i.e. all changes made during the execution of the particular transaction and during execution of its offspring transactions would be committed. After the completion, the transaction object 17 and all depending offspring transactions would be removed from the transaction stack 15.

The rollback_transaction operation allows the effect of executing a specific transaction to be rolled back. Given the hierarchical nature of the transaction management system 10, the effects not only of the specified transaction, but also of its offspring transactions would be rolled back, i.e. all changes made during the execution of this transaction and its offspring transactions would be discarded. After the rollback, the transaction and its offspring would be removed from the transaction stack 15.

The mark_operation method allows the application container 9 to mark a specific operation of a given transaction. The application container 9 can choose to mark all or some operations whenever they occur, by calling the mark_operation method. The operations include, but are not limited to, creation, deletion, modification, and mark-deletion.

The transaction manager 11 assumes that the application container 9 employs an object-oriented and indexable data management model. All data operated on are defined as structures, each of them being composed of other structure instances or primitive types.

Such a data model may contain pure data as well as application state information. The application state is a combination of all global variables, all local variables and parameters.

Moreover, all data (including data comprising an application state) may be indexed. An instance of structure can be referred to by a number index; similarly, any field of the structure is referred to by a number index as well. Such a data representation enables efficient data operations within transaction management system 10. For example, the transaction manager 11 only needs to keep records of references to data for data recovery purposes.

The transaction stack 15 is the storage structure which holds transaction objects that have been started but are not yet completed. The transaction stack 15 not only supports operations of a regular stack, i.e. push and pop operations, but also extends its functionality to support a mark operation, allowing the change of a transaction of the stack 15 without popping the transaction off the transaction stack 15.

As has been discussed above, push happens when a new transaction is started and is added onto the stack 15, while pop occurs when a transaction is completed or rolled back and is therefore removed from the stack 15. The mark operation is used to update the transaction that has been started. The transaction stack 15 is used to implement the concept of hierarchically ordered transactions, i.e. each transaction may have a parent transaction as well as nested offspring transactions.

In an embodiment, a hierarchical structure such as a one-branch tree is adequate to meet the transaction requirements of a wireless application. The first transaction to be pushed onto the one-branch tree is the parent of all transactions, while the second one is the first offspring of the parent transaction, but the parent of all other transactions.

While the description will be made with reference to a one-branch tree or a stack, the dynamic methods provided for operating on the transactions of the stack allow processing as if dealing with a "real" hierarchical structure. For example, the complexity of the hierarchical structure of the nested transactions can be increased by extending support for other methods to operate on the transaction stack, e.g. completing or rolling back one transaction without popping it off the stack.

Figure 3:
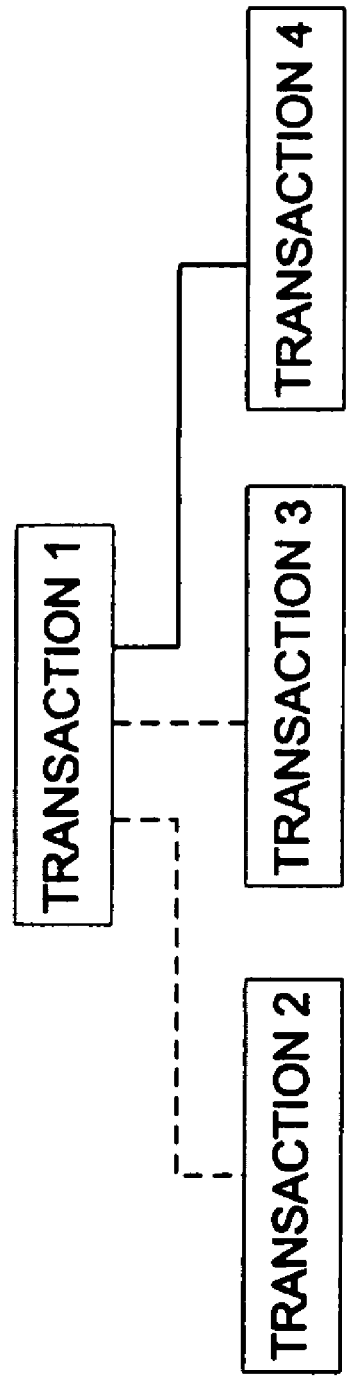
FIG. 3 is a block diagram showing a hierarchically structured transaction according to an embodiment.

Now, with respect to FIG. 3, a hierarchical structure of nested transactions will be described.

The relations represented in dotted lines, between transaction 1 and transactions 2 and 3, respectively, are not realized at runtime, while the solid line represents the relation that is realized between transaction 1 and transaction 4.

The operation rule implemented is that in order to complete any transaction i (i is the transaction ID of a given transaction), transaction i would be completed first, then its immediate transaction j=immediate_offspring(i), would be completed. This procedure is repeated recursively, until there are no more offspring transactions j of parent transaction i to be completed.

On the contrary, to roll back any parent transaction i, its immediate offspring transactions j should be rolled back first; transaction i cannot be rolled back until all of its offspring transactions j are rolled back. The rule applies to all offspring transactions j recursively. The rule is easily implemented with the order given by the transaction stack 15: starting at the top of the transaction stack 15, all transactions are rolled back until i is rolled back.

Although the above description relates to a specific preferred embodiment as presently contemplated by the inventor, it will be understood that the application in its broad aspect includes mechanical and functional equivalents of the elements described herein.

We claim:

1. An application container-level transaction management system for managing nested transactions of an application on a wireless device, the system comprising:
a processor coupled to a memory having computer-readable instructions for execution by the processor, the instructions causing the processor to implement:
a transaction manager for providing an interface to said application container for accessing methods for creation and execution of nested transactions in a hierarchical nested order;
each nested transaction including at least a parent transaction and a child transaction, and each of the parent and child transaction including at least two correlative operations;
where completing execution of each transaction includes completing execution of all correlative operations belonging to each respective transaction; and
a transaction stack for storing said transactions to be executed in an execution order according to said hierarchical nested order, said order of execution providing for at least one of rollback and completion of said correlative operations.

2. The system of claim 1, wherein said transactions comprise transaction objects.

3. The system of claim 2, wherein said transaction objects comprise transaction identification, sequence of operation information and data recovery information.

4. The system of claim 3, wherein said sequence of operation information comprises an indexing of said operations by associating data reference numbers to respective operation.

5. The system of claim 3, wherein the instructions further cause the processor to implement a transaction pool for storing said transactions objects.

6. The system of claim 5, wherein said transaction pool is for generating said transaction identification.

7. The system of claim 3, wherein said data recovery information comprises sequences of numbers used to keep track of data that might need recovery.

8. The system of claim 1, wherein said methods comprise at least one of a start_transaction method, which is for returning the identification of a started transaction; a complete_transaction, which is for completing the specified transaction and all other transactions lower in the hierarchical nested order; a roll_back transaction, which is for discarding all changes made during the execution of a transaction as well as the changes made during the execution of all other transaction lower in the hierarchical nested order.

9. The system of claim 1, wherein said hierarchical nested order comprises only one branch.

10. A method for managing execution of nested transactions in an application container of a wireless device, the method comprising:
obtaining a nested transaction created by said application container;
each nested transaction including at least a parent transaction and a child transaction, and each of the parent and child transaction including at least two correlative operations;
where completing execution of each transaction includes completing execution of all correlative operations belonging to each respective transaction;
adding said transaction to a stack, and if said transaction has offspring transactions, adding said offspring transactions to said stack in an execution order according to a hierarchical nested order defined by the relationship between said transactions;
executing said transactions in said execution order; and
removing said transactions from said stack following execution.

11. The method of claim 10, wherein said transactions comprise transaction objects.

12. The method of claim 11, wherein said transaction objects comprise transaction identification, sequence of operation information and data recovery information.

13. The method of claim 12, wherein said sequence of operation information comprises an indexing of said operations by associating data reference numbers to respective operation.

14. The method of claim 12, further comprising storing said transactions objects.

15. The method of claim 14, further comprising generating said transaction identification from a transaction pool for storing said transaction objects.

16. The method of claim 12, further comprising using said data recovery information for keeping track of data that might need recovery.

17. The method of claim 10, further comprising providing an interface to said application container for accessing methods for creation and execution of transactions in a hierarchical nested order.

18. The method of claim 17, wherein said methods comprise at least one of a start_transaction method, which is for returning the identification of a started transaction; a complete_transaction, which is for completing the specified transaction and all other transactions lower in the hierarchical nested order; a roll_back transaction, which is for discarding all changes made during the execution of a transaction as well as the changes made during the execution of all other transaction lower in the hierarchical nested order.

19. The method of claim 10, wherein said hierarchical nested order comprises only one branch.

20. A non-transitory computer program product having encoded thereon computer-readable instructions for executing a method for managing execution of nested transactions in an application container of a wireless device, each nested transaction including at least a parent transaction and a child transaction, each of the parent and child transaction including at least two correlative operations, where completing execution of each transaction includes completing execution of all correlative operations belonging to each respective transaction, the instructions, when executed, causing a processor to:
obtain a transaction created by said application container;
add said transaction to a stack, and if said transaction has offspring transactions, adding said offspring transactions to said stack in an execution order according to a hierarchical nested order defined by the relationship between said transactions;
execute said transactions in said execution order; and
remove said transactions from said stack following execution.

* * * * *